United States Patent [19]

Nishibata et al.

[11] Patent Number: 4,789,388
[45] Date of Patent: Dec. 6, 1988

[54] OXYGEN ENRICHING APPARATUS

[75] Inventors: Katsuji Nishibata, Iwakuni; Hiroshi Takano, Suita; Masaru Itai, Hino; Tsugutaka Shimote, Yamaguchi, all of Japan

[73] Assignee: Teijin Limited, Osaka, Japan

[21] Appl. No.: 163,124

[22] Filed: Feb. 17, 1988

Related U.S. Application Data

[63] Continuation of Ser. No. 63,760, Jun. 23, 1987, abandoned, which is a continuation of Ser. No. 801,092, Nov. 22, 1985, abandoned.

[30] Foreign Application Priority Data

| Dec. 27, 1984 | [JP] | Japan | 59-273940 |
| Dec. 28, 1984 | [JP] | Japan | 59-274654 |
| Dec. 28, 1984 | [JP] | Japan | 59-274655 |
| Dec. 28, 1984 | [JP] | Japan | 59-274652 |
| Dec. 28, 1984 | [JP] | Japan | 59-274653 |

[51] Int. Cl.$^4$ .................................. B01D 53/22
[52] U.S. Cl. ........................ 55/158; 55/160; 55/193; 55/276
[58] Field of Search ............... 55/16, 68, 158, 160, 55/193, 276

[56] References Cited

U.S. PATENT DOCUMENTS

| 1,048,435 | 12/1912 | Still | 55/276 |
| 1,983,304 | 12/1934 | Olson | 55/276 X |
| 3,156,233 | 11/1964 | O'Connell | 55/276 X |
| 3,375,640 | 4/1968 | Pelosi, Jr. | 55/276 |
| 3,509,697 | 5/1970 | DeWey et al. | 55/276 |
| 3,804,942 | 4/1974 | Kato et al. | 55/276 X |
| 3,930,813 | 1/1976 | Gessner | 55/16 |
| 3,930,814 | 1/1976 | Gessner | 55/16 |
| 3,976,451 | 8/1976 | Blackmer et al. | 55/158 |
| 3,979,190 | 9/1976 | Hedman | 55/158 |
| 4,174,955 | 11/1979 | Blackmer et al. | 55/158 |
| 4,198,213 | 4/1980 | Mannatt | 55/16 |
| 4,397,661 | 8/1983 | King et al. | 55/158 |
| 4,508,548 | 4/1985 | Manatt | 55/16 X |
| 4,537,606 | 8/1985 | Itoh et al. | 55/158 |
| 4,553,988 | 11/1985 | Shimizu et al. | 55/158 |
| 4,556,180 | 12/1985 | Manatt | 55/158 X |
| 4,576,616 | 3/1986 | Mottram et al. | 55/68 |

FOREIGN PATENT DOCUMENTS

| 190570 | 11/1982 | Japan . |
| 61819 | 4/1983 | Japan . |
| 203705 | 11/1984 | Japan . |
| 118603 | 6/1985 | Japan . |
| 137805 | 7/1985 | Japan . |
| 200804 | 10/1985 | Japan . |

Primary Examiner—Robert Spitzer
Attorney, Agent, or Firm—Kenyon & Kenyon

[57] ABSTRACT

An apparatus for producing oxygen enriched air from the atmospheric air, including an oxygen enriching system employing a fan for inducing a flow of atmospheric air through an oxygen enriching unit and a pump for deriving the oxygen enriched air from the oxygen enriching unit, a sound-proof box for encasing the fan and pump, an air intake passage having not less than five bends and an air exhaust passage also having not less than five bends. The oxygen enriching unit is provided with a unit for adjusting an oxygen concentration to a constant level regardless of any change in the atmospheric temperature.

37 Claims, 10 Drawing Sheets

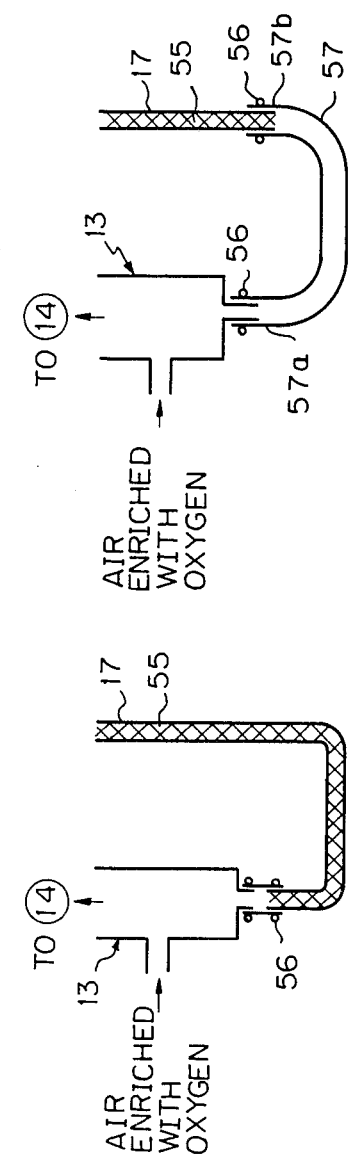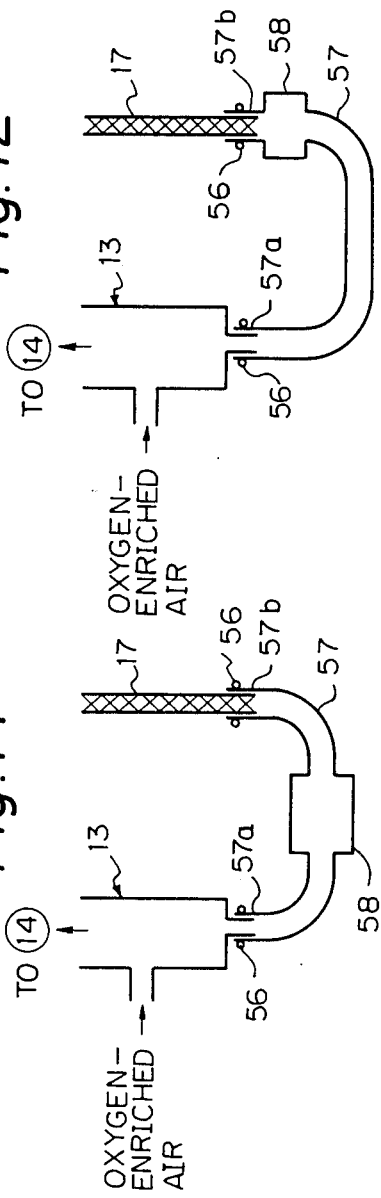

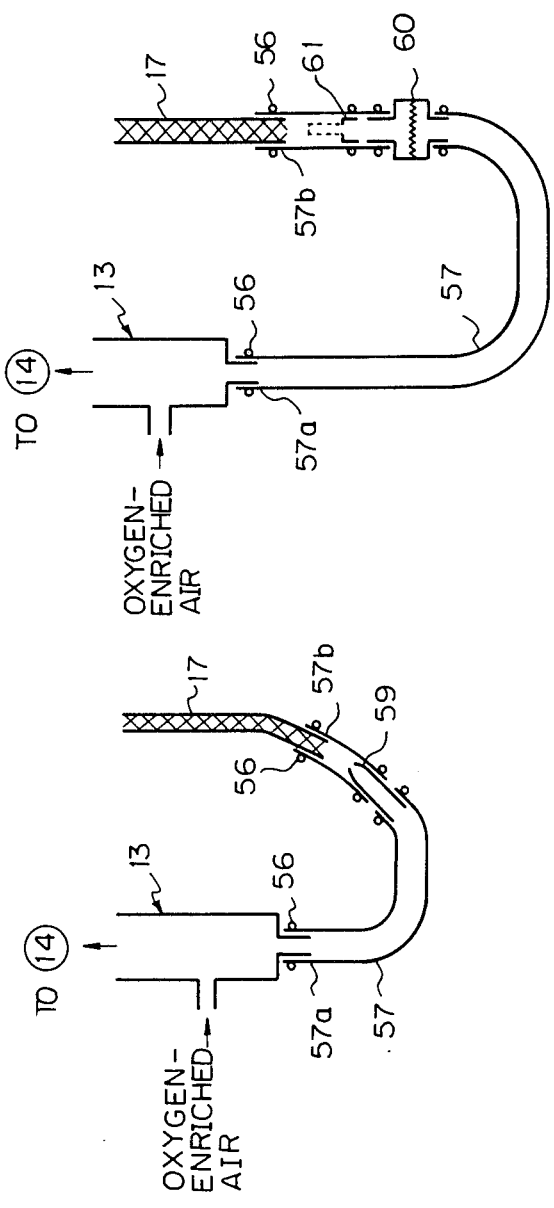

OXYGEN ENRICHING APPARATUS

This application is a continuation, of application Ser. No. 063,760 filed June 23, 1987, which is a continuation of Ser. No. 801,092 filed Nov. 22, 1985, both abandoned.

BACKGROUND OF THE INVENTION

1. Field of the Invention

The present invention relates to an apparatus for efficiently and stably producing oxygen-enriched air from atmospheric air and, particularly, to an oxygen enriching apparatus suitable for medical purposes.

2. Description of the Related Art

In the treatment of patients suffering from respiratory ailments such as asthma, emphysema, and chronic bronchitis, one of the most effective therapies is oxygen inhalation. In this regard, an oxygen enriching apparatus which can be operated at the patient's bedside to extract oxygen from the atmosphere and to produce oxygen-enriched air has attracted attention as a simple source of oxygen for oxygen inhalation purposes. Oxygen enriching apparatuses for such purposes are classified generally into two types: an adsorption separation type employing an adsorbent, such as zeolite, which adsorbs nitrogen selectively at a higher rate than oxygen, and a membrane separation type employing selectively permeable membranes which permit the permeation of oxygen at a higher rate than nitrogen.

Both the adsorption separation type and the membrane separation type of oxygen enriching apparatus utilize a motor-drive pump. In the adsorption separation type, the atmosphere is compressed by the pump to 1 to 3 $kg/cm^2G$, and the compressed atmosphere then brought into contact with an adsorbent to adsorb nitrogen. In the membrane separation type, the pump is used to maintain the oxygen-enriched air, which has permeated through the selectively permeable membranes, at a vacuum of 100 to 300 torr to provide oxygen-enriched air having a preselected oxygen concentration.

Because these apparatuses utilize different types of pumps, the noise level of the membrane separation type oxygen enriching apparatus is lower than that of the adsorption separation type oxygen enriching apparatus, and hence the former is more suitable for home use. However, the conventional oxygen enriching apparatus is not satisfactory from the viewpoint of noise suppression, in that the noise level thereof is still too high. Particularly, a low-noise oxygen enriching apparatus which will not disturb the patient's sleep during the night has not yet been provided.

Several measures to reduce noise are well-known, such as sealing off the noise source with sound insulating walls, damping the vibration of the noise source to suppress sound propagation through solid forms, and attenuating the sound by applying a sound absorbing material to the inner surface of walls enclosing the sound source.

Such noise suppressing measures are applied to the conventional oxygen enriching apparatus, but their effect is unsatisfactory. For instance, when a sound insulating wall for sealing off the noise source is used, the mass of the sound insulating wall is increased to enhance the sound insulating ability thereof. However, an excessive increase in the wall thickness of the sound insulating wall causes an undesirable increase in the weight and size of the apparatus. Conversely, when the noise propagated through the air inlet and air outlet is greater than the noise transmitted through the walls, the limitation of the general noise level of the apparatus is dependent on the noise propagated through the air passage, and hence the sound insulation of the walls is ineffective.

The application of an insulating material to the inner surface of the air passage is sometimes unsatisfactory, in that if an excessive thickness must be applied, the cross sectional area of the air passage is excessively reduced, which increases the air flow resistance of the air passage thus reducing the flow rate of the air, which sometimes causes problems such as insufficient cooling of the pump and other components. Thus the prior art has been unable to provide satisfactory measures to suppress the noise of an oxygen enriching apparatus without causing a deterioration in the performance of the oxygen enriching apparatus and increasing the weight and size of the same.

Moreover, most conventional membrane separation type oxygen enriching apparatuses operate with a fixed number of membrane elements. Such an oxygen enriching apparatus is capable of providing oxygen-enriched air having a preselected oxygen concentration when the temperature of the ambient air is approximately normal. However, in hot seasons such as summer, where the ambient temperature exceeds, for example, 30° C., such an oxygen enriching apparatus is able only to provide oxygen-enriched air of an oxygen concentration far lower than the preselected oxygen concentration. Furthermore, in the conventional oxygen enriching apparatus operating under a high ambient temperature, the flow rate of the oxygen-enriched air is excessively high, and hence the surplus oxygen-enriched air is unavoidably discharged into the atmosphere to no purpose.

In the prior art, an oxygen enriching apparatus equipped with a control valve for each oxygen-permeable membrane element has been proposed in order to vary the number of operational oxygen-permeable membrane elements. Such an oxygen enriching apparatus, however, requires sophisticated and expensive control valves and complicated operating procedures. Further, in conventional membrane separation type oxygen enriching apparatus, the condensate obtained by cooling the oxygen-enriched air is discharged from a moisture separator through a drain pipe packed with filaments. Sometimes, the condensate contains foreign matter, such as solid substances produced in the drain pipe by NOx and SOx dissolved in the condensate and particles produced by the diaphragm vacuum pump. This foreign matter is liable to accumulate in the vicinity of and clog the inlet of the drain pipe, impeding the normal draining of the condensate.

Also, during discharge of the condensate, the condensate is liable to spatter from the outlet of the drain pipe onto components lying around the outlet of the drain pipe, to corrode the components or to leak outside the apparatus.

In a medical oxygen enriching apparatus, in particular, it is important to drain the condensate stably under all conditions for an extended period of operation throughout all seasons so that an appropriately humidified oxygen-enriched air not containing water droplets is supplied to the patient. Supplying oxygen-enriched air in which moisture is insufficiently removed, i.e., containing water droplets, is unhealthy, and the spattering from the drain is unsanitary. Accordingly, such an oxygen enriching apparatus is not at all suitable for medical purposes, and thus there is a strong demand that such problems of the conventional oxygen enriching apparatus be solved as soon as possible.

Since medical oxygen enriching apparatuses, in particular, are used at the patient's bedside in the hospital or in the home, sanitary oxygen-enriched air having a preselected oxygen concentration must be supplied by those apparatuses. However, in the conventional oxygen enriching apparatus, occasionally the motor for driving the pump cannot be started when the operation of the apparatus is restarted immediately after an interruption of the operation, which is disadvantageous from the viewpoint of accessibility. It is important that the oxygen enriching apparatus be accessible and stable in operation.

SUMMARY OF THE INVENTION

Accordingly, an object of the present invention is to provide an oxygen enriching apparatus capable of a substantially silent operation at a patient's bedside at a reduced noise level which will not bother the patient.

Another object of the present invention is to provide an oxygen enriching apparatus capable of operating at a lower noise level than the conventional oxygen enriching apparatus, having a weight and size only slightly greater than those of the conventional oxygen enriching apparatus, and having the same function as that of the conventional oxygen enriching apparatus.

It is a further object of the present invention to provide an oxygen enriching apparatus capable of efficiently and stably producing oxygen-enriched air having a preselected oxygen concentration even at a high atmospheric temperature in hot seasons, such as in summer.

It is a still further object of the present invention to provide an oxygen enriching apparatus having a construction capable of normally discharging the condensate separated from the oxygen-enriched air for an extended period of operation.

Another important object of the present invention is to provide an oxygen enriching apparatus which is accessible and has a simple construction.

An even further object of the present invention is to provide a safe oxygen enriching apparatus designed to obviate the possibility of non-starting of the motor for driving the vacuum pump and of burn-out of the motor, and having no possibility of producing any injurious gas.

In accordance with one aspect of the present invention, there is provided an apparatus for enriching air with oxygen which comprises an outer casing having an intake opening for intaking atmospheric air and an exhaust opening for exhausting the atmospheric air; an oxygen enriching system accommodated in the outer casing means for supplying oxygen enriched air to a predetermined outlet port, the oxygen enriching system including oxygen enriching means operable to enrich a part of the atmospheric air with oxygen, a motor-driven pump for taking the oxygen enriched air out of the oxygen enriching means, piping for carrying the oxygen enriched air toward the predetermined outlet port, and a fan for causing a flow of the atmospheric air generally directed from the intake opening of the outer casing toward the exhaust opening; a soundproof box for defining therein an impervious-to-sound chamber in which the motor-driven pump and the fan are accommodated and having an inlet port permitting the atmospheric air to flow therein and a separate outlet port for permitting the atmospheric air to flow therefrom after cooling the motor-driven pump and the fan; an air intake passage formed within and extended in the outer casing for restrictively permitting the atmospheric air to flow from the intake opening to the inlet port, the intake passage being subjected to bending at at least five positions lined with a sound absorbing member; and an air exhaust passage formed within and extended in the outer casing for restrictively permitting the atmospheric air to flow from the outlet port of the soundproof box to the exhaust opening, the air exhaust passage being also subjected to bending at at least five positions lined with a sound absorbing member.

In accordance with another aspect of the present invention, there is provided an apparatus for providing oxygen enriched air having a plurality of membrane elements, each, provided with a selectively permeable membrane permitting permeation therethrough of oxygen at a higher rate than nitrogen when atmospheric air is applied thereto, and deriving means for deriving the oxygen enriched air from the plurality of membrane elements. The apparatus is characterized in that the plurality of membrane elements are divided into a predetermined number of groups having substantially different respective effective membrane areas, the predetermined number of groups of membrane elements being provided with respective conduit means for establishing a corresponding number of fluid connections to the means for deriving the oxygen enriched air, and that there is provided means for changing the number of the fluid connections between the predetermined number of groups of membrane elements and the means for deriving the oxygen enriched air within those predetermined numbers.

BRIEF DESCRIPTION OF THE DRAWINGS

The present invention will become more apparent from the ensuing description of embodiments thereof taken in conjunction with the accompanying drawings wherein:

FIG. 9 is a partial schematic view of a water drainage unit of the prior art;

FIGS. 10 through 14 are partial schematic views of water drainage units, according to several embodiments of the present invention;

DESCRIPTION OF THE PREFERRED EMBODIMENTS

Figure 1:
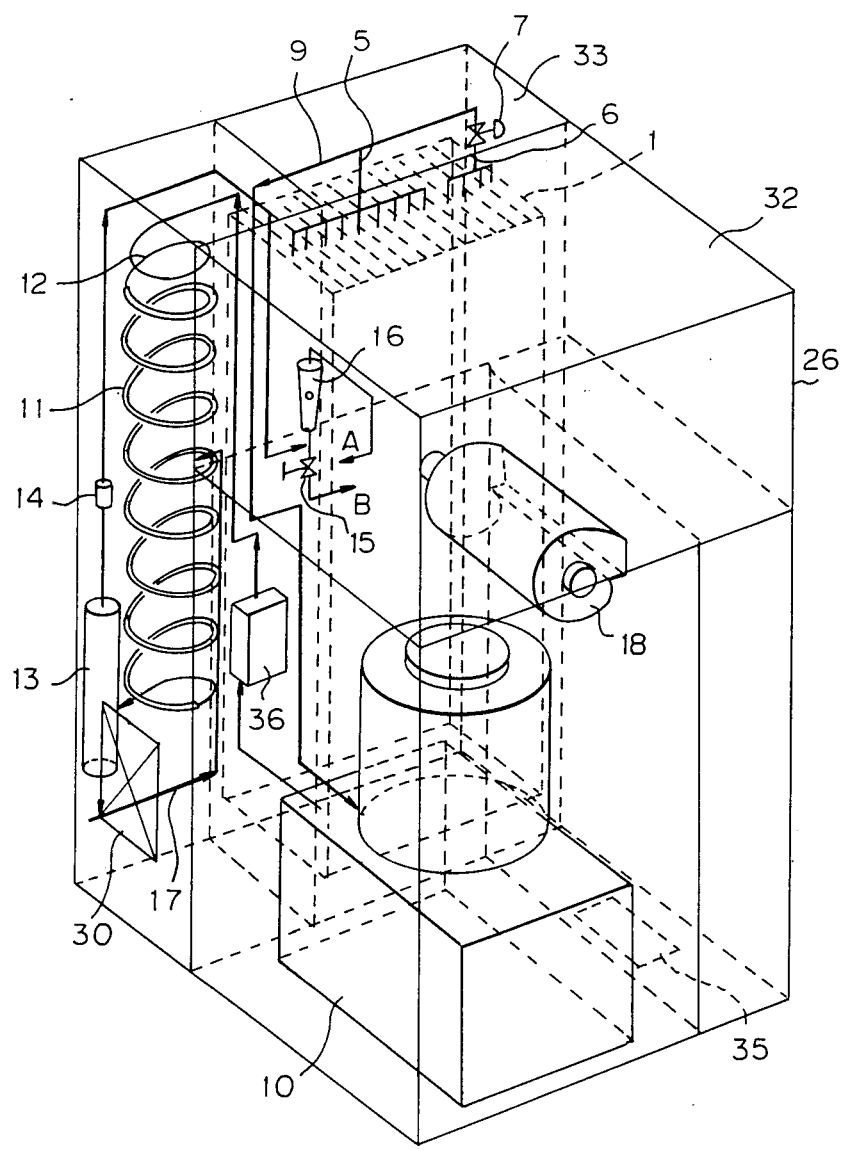
FIG. 1 is a perspective view of an oxygen enriching apparatus, illustrating a general configuration of a membrane separation type oxygen enriching system according to an embodiment of the present invention.

Referring to FIG. 1 showing a general configuration of a membrane separation type oxygen enriching apparatus of an embodiment of the present invention, the oxygen enriching apparatus has an outer casing 26, i.e. a parallelepiped casing, provided with an air intake opening 30 for drawing in air to be enriched with oxygen from the atmosphere and an air exhaust opening 35 for exhausting oxygen-depleted air to the atmosphere. An air enriching system is accommodated in the outer casing 26. This system includes a plurality of juxtaposed membrane elements 1 located in a membrane chamber 33 and having selectively permeable membranes permitting the permeation of oxygen at a higher rate than nitrogen when the atmospheric air from the intake opening 30 is applied to the outer surfaces of the membrane elements 1. The air enriching system also includes a fan 18 for drawing in the atmospheric air from the outside through the air intake opening 30 via an air filter (not illustrated in FIG. 1) and for directing the flow of the atmospheric air toward the membrane elements 1 within the membrane chamber 33. The air enriched with oxygen due to permeation through the membrane elements 1 is drawn off by a vacuum means 10 of the air enriching system through manifolds 5 and 6 and a collecting piping 9. The typical vacuum means 10 is a motor-driven vacuum pump. The air enriching system further includes a muffling tank 36 for deadening the sound of the oxygen enriched air as it is exhausted from the vacuum means 10, a cooling means 12 for condensing the oxygen enriched air, a water separator 13 for separating water from the condensed oxygen enriched air, a pressurizing orifice 14, a flow regulating valve 15 for manually or automatically regulating the flow rate of the oxygen enriched air to a desired level, and a flow meter 16 for indicating an actual flow rate of the oxygen enriched air designated by "A" and discharged for inhalation by a patient. Although not illustrated in FIG. 1, the oxygen enriched air "A" passes through a purifying means having an adsorbent therein, and a bacterial filter, prior to being discharged for inhalation. Surplus oxygen enriched air which is discharged through a port disposed near the flow regulating valve 15 is designated by B.

Further, the water component separated by the water separator 13 is brought up to a water holder 11, which is provided around the cooling means 12, by means of a drain pipe 17. The water caught by the water holder 11 is appropriately carried toward the outside of the oxygen enriching apparatus. A valve 7, described later in detail, is provided to shut the manifold 6 as required but may be omitted in some cases. The oxygen-depleted air flowing out of the membrane chamber 33 is used for cooling the vacuum means 10 and a fan 18 prior to being discharged from the air exhaust opening 35.

An oxygen enriching apparatus incorporating a conventional oxygen enriching system, as well as such an apparatus incorporating the oxygen enriching system as described hereinbefore with reference to FIG. 1, employs a vacuum means and a fan. Accordingly, the oxygen enriching apparatus must be soundproofed. It has been found through a study of ways in which to develop soundproof measures for the oxygen enriching apparatus that accommodating both a motor for driving the vacuum means, which is indispensable to the oxygen enriching apparatus, and the fan for cooling the motor, in a soundproof box and specifying the number of bends in an air intake passage and an air exhaust passage provided before and after the sound insulating box, respectively, are extremely effective for suppressing the noise.

Figure 4:
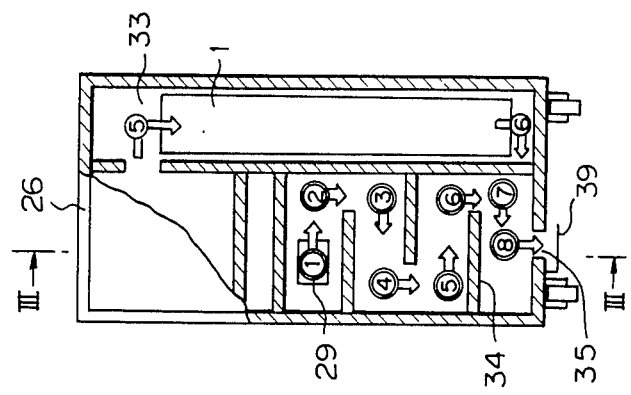
FIG. 4 is an elevational view, partly cutaway, illustrating the back side of the oxygen enriching apparatus of FIG. 2, taken along the line IV—IV of FIG. 3.
Figure 3:
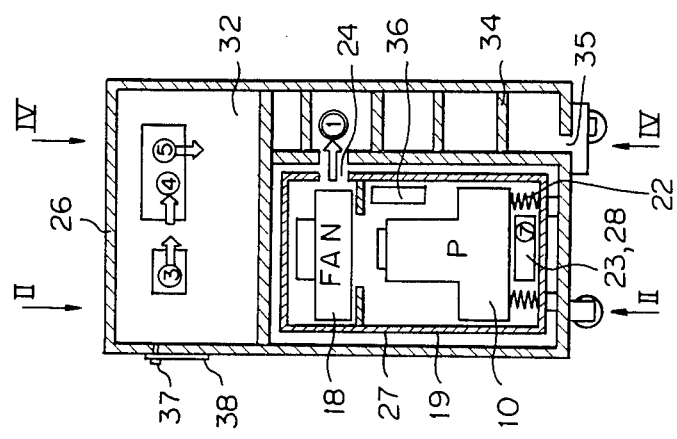
FIG. 3 is a sectional side elevation of the oxygen enriching apparatus of FIG. 2 taken along the line III—III of FIGS. 2 and 4.
Figure 2:
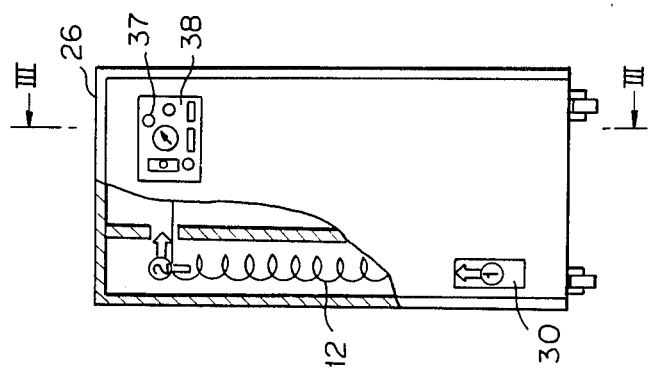
FIG. 2 is a front elevation, partly cutaway, of the oxygen enriching apparatus incorporating the oxygen enriching system of FIG. 1, taken along the line II—II of FIG. 3.

FIG. 2 shows a soundproof oxygen enriching apparatus, in a preferred embodiment, according to the present invention, in which the soundproof measures of the present invention are applied to an oxygen enriching apparatus equipped with the oxygen enriching system as shown in FIG. 1 employing selectively permeable membranes. FIGS. 2, 3, and 4 are a front view, a side view, and a rear view, respectively, of the soundproof oxygen enriching apparatus according to the present invention. The cutaway portion in FIG. 2 corresponds to a section taken along line II—II of FIG. 3, while the cutaway portion in FIG. 4 corresponds to a section taken along line IV—IV of FIG. 3. FIG. 3 is a sectional view taken along line III—III of FIGS. 2 and 4.

Referring to FIGS. 2 to 4, a vacuum pump 10 and a fan 18, i.e., noise sources, are accommodated within a metallic soundproof box 19 internally lined with a damping material and a sound absorbing material. The vacuum pump 10 is supported through springs 22 on the bottom surface of the soundproof box 19 so that vibration of the vacuum pump 10 is absorbed by the springs 22. An air inlet port 23 and an air outlet port 24 are formed in the soundproof box 19. An outer casing 26 of the apparatus is a wooden cabinet. The soundproof box 19 accommodating the vacuum pump 10 and the fan 18 is disposed within a chamber 27. An air entrance 28 and an air exit 29 are formed in the walls of the chamber 27 so as to correspond to the air inlet port 23 and the air outlet port 24 of the soundproof box 19, respectively.

In this embodiment, the atmosphere drawn in through an air intake opening 30 formed in the cabinet 26 flows via a cooling tube 12, an instrument chamber 32, and a membrane chamber 33 accommodating membrane elements 1 to the sound-proof box 19. Thus, as shown in FIGS. 2 and 3, the air intake passage from the air intake opening 30 to the soundproof box 19 is bent at seven positions; i.e., at position ① at the air intake opening 30, at position ② at the upper part of a cooling tube chamber, at positions ③, ④ and ⑤ between the instrument chamber 32 and the membrane chamber 33 and at positions ⑥ and ⑦ between the lower part of the membrane chamber 33 and the air inlet port 23 of the soundproof box 19, and the air exhaust passage including a zigzag passage defined by partition plates 34 is bent at eight positions between the air outlet port 24 of the soundproof box 19 and the air exhaust opening 35 having a tray 39 therebelow, namely, at positions ① to ⑧. Turning the air flow at the air exhaust opening 35 has only a little effect on reducing the noise, and hence the noise reducing effect of turning the air flow at the air exhaust opening 35 may as well be disregarded. The air intake passage and the air exhaust passage described above are lined with a sound absorbing material.

The oxygen-enriched air drawn off across the selectively permeable membranes by the vacuum pump 10 is guided through a silencer tank 36, to deaden the pulsation sound of the oxygen-enriched air caused by the pulsative operation of the vacuum pump 10, and carried by a conduit (not shown) to an oxygen-enriched air outlet port 37. Preferably, the silencer tank 36 is disposed within the soundproof box 19.

As described hereinbefore, the oxygen enriching apparatus of the present invention is characterized by accommodating a motor (not shown), the pump means 10 driven by the motor and the fan means 18 in the soundproof box 19 and bending the air intake passage between the air intake opening 30 and the soundproof box 19 and the air exhaust passage between the soundproof box 19 and the air exhaust opening 35 at at least five positions, preferably at at least seven positions.

From the viewpoint of effective noise suppression, the respective lengths of the air intake passage and the air exhaust passage are not less than the minimum dimension of the outer casing 26, preferably, 1.5 times the minimum dimension. In addition, it is desirable that the length of the air exhaust passage be in the range of 0.4 to 2.0 times, preferably, 0.5 to 1.5 times that of the air intake passage. When the air intake passage and the air exhaust passage do not meet these conditions, insufficient noise attenuation results and unbalanced noise attenuation occurs between the air intake passage and the air exhaust passage, and thereby attenuation of the noise in either the air intake passage or the air exhaust passage is liable to be unsatisfactory.

Generally, when the length of an air passage is increased, the noise attenuating effect of the air passage is enhanced accordingly. However, the length of the air passage of the oxygen enriching apparatus which generates a complex noise consisting of sounds having various frequencies must be determined very carefully, or, instead of being attenuated, the noise may possibly be amplified due to resonance. Nevertheless, according to the present invention, the air passage is bent at at least five positions, which, when the air passage has a specific length, suppresses noise having various frequencies and reduces the noise at practically the same rate at both the intake opening and exhaust opening. It is preferable to provide at least the bends in the air passage with a sound absorbing material. Further noise reduction is possible by internally and entirely lining the air passage with a sound absorbing material. The outer casing 26, i.e., the cabinet, of the oxygen enriching apparatus is a box formed by a sound absorbing material. Wood is a preferable sound absorbing material. Desirably, the box is sealed entirely except for the air intake opening, the air exhaust opening, and the oxygen-enriched air outlet port. At least the portions of the walls of the box adjacent to the noise sources must have a sufficient thickness and a sound absorbing material applied to the inner surfaces of such portions. Concrete means for sealing the box are the employment of dovetail joints and of grilling the panel. It is preferable to form the panel section in a double construction. From the viewpoint of sound insulation, the wall thickness of the wooden box should be 15 mm or more and, in view of forming a lightweight wooden box, the preferable wall thickness should be in the range of from 15 to 20 mm. Rooting the inner surface of the portion which is not exposed directly to the noise is effective for reducing the weight of the wooden box.

For the soundproof box, which is one of the features of the present invention, any material may be used, but the soundproof box must have a mass large enough to insulate the noise. From the viewpoint of forming the soundproof box in a compact construction, it is preferable to construct the soundproof box with metallic plates, such as steel plates. Preferably, the thickness of the metallic plates is 0.7 mm or more, however, from the viewpoint of constructing the oxygen enriching apparatus in a lightweight construction, it is desirable that the thickness of the metallic plates be not greater than 1.5 mm. For effective sound insulation, preferably, the soundproof box is provided internally with a vibration damping material and a sound absorbing material and, desirably, is contained in a wooden box with the exterior of the soundproof box spaced apart from the inner surfaces of the wooden box, and is accommodated within the cabinet.

The provision of the silencer tank for attenuating the pulsative sound of the vacuum pump on the discharge side of the vacuum pump is effective for suppressing the noise in the oxygen-enriched air discharge system. Disposing the silencer tank within the soundproof box is particularly effective. Ordinarily, the flow regulating valve 15 (FIG. 1) capable of discharging the surplus oxygen-enriched air is provided. To suppress the noise produced as the surplus oxygen-enriched air is discharged, it is desirable to provide an exhaust pipe having an appropriate length, to provide a surge tank, or to provide the exhaust pipe with a bend or bends.

Figure 5:
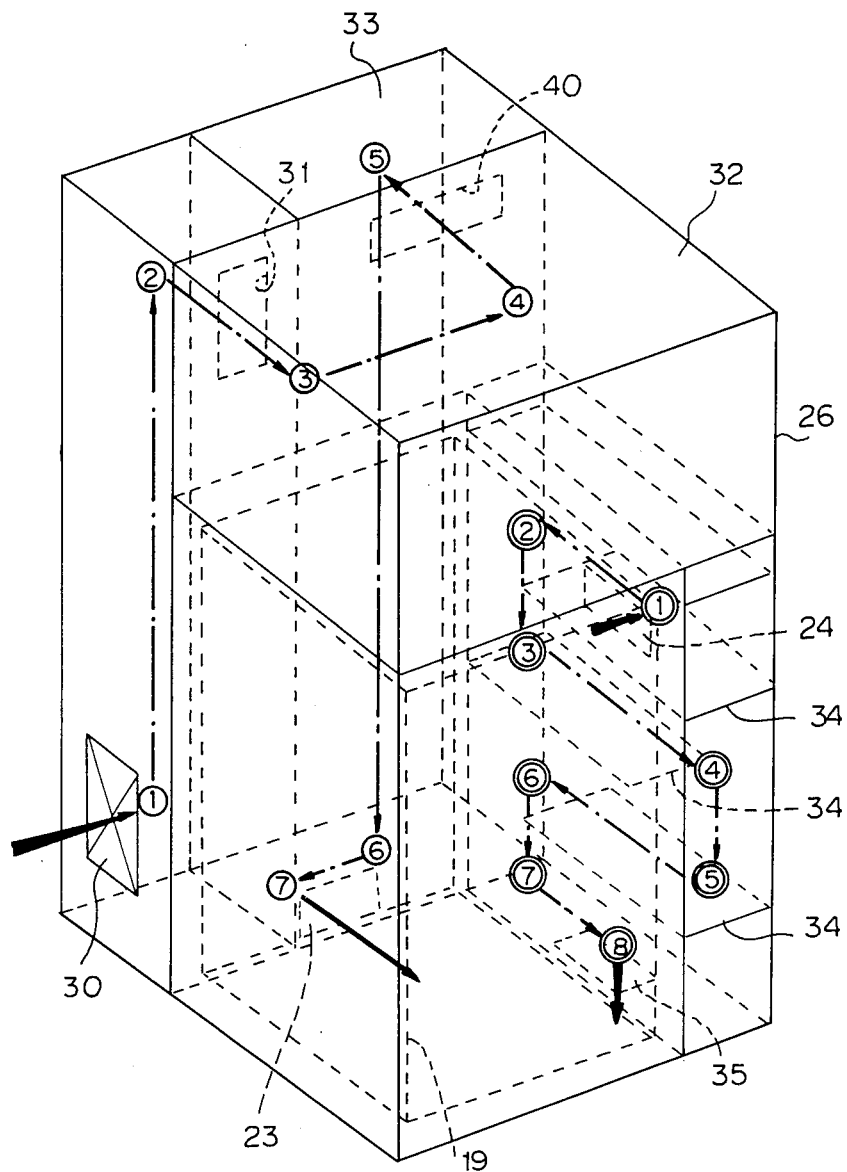
FIG. 5 is a perspective view of the apparatus of FIGS. 2 through 4, illustrating the air intake and exhaust passages, according to the present invention.

FIG. 5 is a perspective view of the outer casing 26 of the oxygen enriching apparatus as shown in FIGS. 2 through 4 and illustrates, in thick chain lines, the air intake passage extending from the air intake opening 30 through the interior of the soundproof box 19 and the air exhaust passage extending from the air outlet port 24 of the soundproof box 19 to the air exhaust opening 35. It will be clearly understood that the air intake passage is subjected to right-angled bending in three dimensions seven times for the purpose of deadening the sound noise of the air. Opening 31 is an entrance opening to the instrument chamber 32, and an opening 40 is an entrance opening from the chamber 32 to the membrane chamber 33. It will also be understood that the air exhaust passage is subjected to substantially right-angled bending eight times in a zigzag manner due to the provision of a plurality of partition plates 34.

In order to verify the effectiveness of the noise suppression achieved by the present invention, the present inventors conducted a test as summarized below.

TEST I

Four types of oxygen enriching apparatuses differing from each other in the number of bends in the air exhaust passage and the ratio in length of the air exhaust passage and the air intake passage as shown in Table 1 were constructed by varying the number of partition plates 34 disposed in the air exhaust passage of the oxygen enriching apparatus equipped with thirty membrane elements accommodated within the membrane chamber 33, each of these elements consisting of a support frame and selectively oxygen-permeable membranes of poly 4-methyl pentene-1 attached to both sides of the support frame, as shown in FIGS. 2 to 5. In each of these oxygen enriching apparatuses, the number of bends in the air intake passage is seven, the surplus oxygen-enriched air exhaust portion of the flow regulating means 15 (FIG. 1) is provided with a soft vinyl chloride tube having an inside diameter of 6 mm and a length of 23 cm as the exhaust pipe for exhausting the surplus oxygen-enriched air to the atmosphere, the vacuum pump 10 is a diaphragm vacuum pump, and the fan 18 is a sirocco fan.

The test was conducted in such a manner that these four types of oxygen enriching apparatuses, namely embodiments No. 1 and No. 2, and test specimens No. 1 and No. 2 were operated to measure the noise, respectively. The noise was measured at a position 40 cm above the floor and 1 meter away from the front of each apparatus in a Western style room after each oxygen enriching apparatus had been operated for two hours. The oxygen enriching apparatus were operated on two kinds of electric AC power sources, namely, a 50 Hz power source and a 60 Hz power source. A noise measuring device manufactured by RION, a company in Japan, was used for measuring the noise. The average background noise of the room was 24 dB(A). The measured results are shown in Table 1. The noise levels of the oxygen enriching apparatus of the embodiment No. 1 as operated on 50 Hz power source and measured in an anechoic room was 26 dB(A).

TABLE 1

|  | Embodiment | | Specimen | |
| --- | --- | --- | --- | --- |
|  | No. 1 | No. 2 | No. 1 | No. 2 |
| Number of partition plates | 3 | 2 | 1 | 0 |
| Number of bends | 8 | 6 | 4 | 2 |
| Air passage length ratio (Exhaust/Intake) | 0.5 | 0.4 | 0.3 | 0.25 |
| Noise level [dB(A)] | | | | |
| 50 Hz | 35 | 36 | 41 | 42 |
| 60 Hz | 37 | 38 | 42 | 43 |

In accordance with one aspect of the present invention, there is provided an oxygen enriching apparatus having a motor-driven pump and motor-driven fan and adapted for production of oxygen-enriched air from atmospheric air, characterized by an intake opening and an exhaust opening each being formed in the surface of an outer casing; and a chamber construction for accommodating the motors, the pump and the fan, including a soundproof box having an air inlet port provided on a soundproof wall of the chamber construction for introducing the air into the chamber construction and an outlet port provided on the soundproof wall for exhausting the air from the chamber construction therethrough, an air intake passage for restrictively directing the atmospheric air from the intake opening to the air inlet port, an air exhaust passage for restrictively directing the atmosphere from the air outlet port to the exhaust opening, the air intake passage and the air exhaust passage each having at least five bends, and at least the inner surfaces of the bends being provided with a sound absorbing material.

Thus the present invention provides an extremely silent medical oxygen enriching apparatus having excellent operating characteristics. Particularly, this oxygen enriching apparatus will not disturb the patient even when operated at the patient's bedside during the night, which is a notable advantage. Furthermore, since the sound insulating measures incorporated into this oxygen enriching apparatus do not particularly increase the weight and size of the apparatus, this oxygen enriching apparatus is easily portable.

Although the invention has been described with reference to the embodiments thereof shown in FIGS. 2 to 5 as applied to an oxygen enriching apparatus employing selectively permeable membranes, it is to be understood that the present invention is applicable also to an oxygen enriching apparatus employing adsorption separation type oxygen enriching elements or to an oxygen enriching apparatus employing, in combination, membrane separation type oxygen enriching elements and adsorption separation type oxygen enriching elements.

An embodiment of the noise reducing means of the surplus oxygen-enriched air discharging portion will be described hereinafter with reference to FIGS. 6 and 7, in which like reference characters designate like or corresponding parts throughout.

The oxygen-enriched air supplying capacity of an oxygen enriching apparatus which produces an oxygen-enriched air from the atmospheric air by drawing-in the atmospheric air with a pump is dependent mainly on the output capacity of the pump, and hence the oxygen-enriched air supplying capacity of such an oxygen enriching apparatus is substantially constant.

On the other hand, when the amount of oxygen-enriched air consumed by the patient is less than that produced by the oxygen enriching apparatus, the surplus oxygen-enriched air is discharged outside the apparatus.

Ordinarily, the flow regulating device employed in the oxygen enriching apparatus is a needle type by-pass valve, and the flowmeter employed in the same is a float type area flowmeter. Some oxygen enriching apparatuses are equipped with a combination of a flow regulating device and a flowmeter, and since the flowmeter and the flow regulating device are operated frequently by the user, they are arranged at the front side of the oxygen enriching apparatus. Namely, the control unit is usually mounted on a control panel provided on the front side of the oxygen enriching apparatus.

Figure 6:
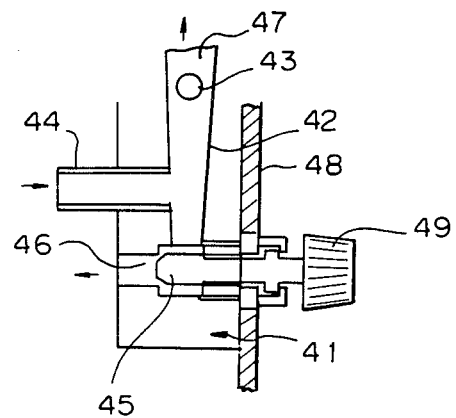
FIG. 6 is a schematic view of a flow regulating means of the prior art accommodated in a conventional oxygen enriching apparatus.

FIG. 6 illustrates an example of a conventional flow regulating device incorporating a flowmeter. The flow regulating device comprises a body 41, a taper tube 42, a float 43, an oxygen-enriched air inlet port 44, a needle 45, a surplus air exhaust port 46, and an oxygen-enriched air outlet port 47. The flow regulating device is disposed near the control panel 48 of the oxygen enriching apparatus.

In such a conventional oxygen enriching apparatus, surplus oxygen-enriched air to be exhausted increases when demand by the user for the oxygen-enriched air is small, and thereby the exhaust noise transmitted through the control panel 48 is enhanced, which bothers the user.

According to the present invention, the noise suppressing means is provided at the surplus air exhaust port of such a flow regulating device.

Figure 7:
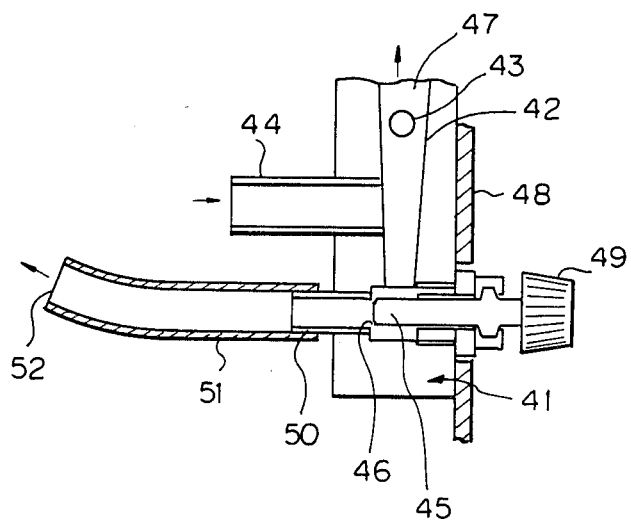
FIG. 7 is a schematic view of a flow regulating means of an oxygen enriching apparatus of the present invention, provided for regulating the flow rate of the oxygen enriched air.
Figure 8:
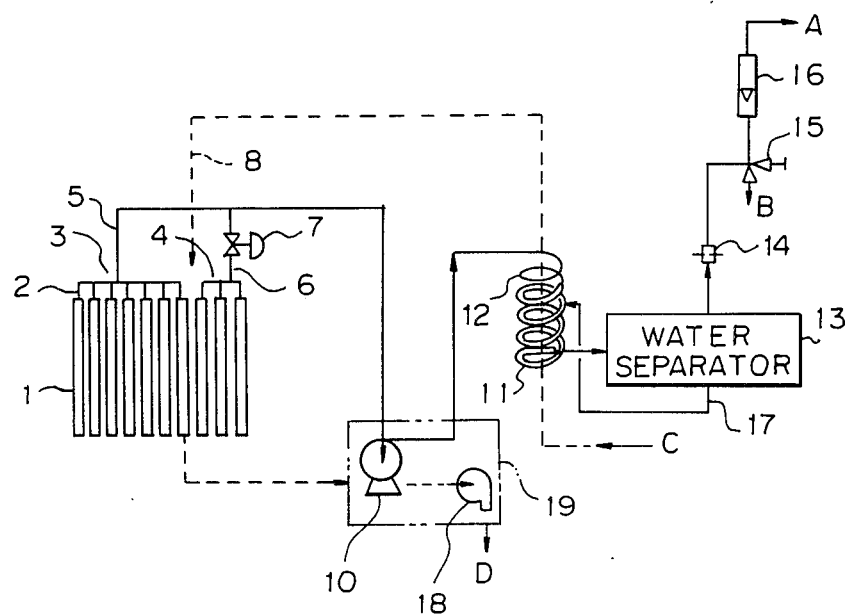
FIG. 8 is a block diagram illustrating a membrane separation type oxygen enriching system, according to a preferred embodiment of the present invention.

FIG. 7 illustrates an example of a flow regulating device according to the present invention. As illustrated in FIG. 8, the surplus air exhaust port 46 of the flow regulating device is provided with a pipe coupling 50, which extends toward the inside of the oxygen enriching apparatus. One end of a resin tube 51 is connected to the pipe coupling 50, while the other end thereof is placed at a position remote from the control panel 48 on the front side of the oxygen enriching apparatus. When the open end of the resin tube 51, i.e., the exhaust opening 52, is at least 5 cm away, preferably, 10 cm or more away, from the control panel 48, the exhaust noise at the control panel is diffused and attenuated. Accordingly, the noise transmitted through the control panel is reduced remarkably to an extent where the user is not bothered by the noise.

The exhaust noise suppressing means is not limited to the combination of the pipe coupling and the resin tube as shown in FIG. 7, but any means is applicable provided that the final exhaust opening 52 is a sufficient distance away from the control panel 48.

When a pipe is employed in the noise suppressing means, a bend or bends and/or a noise suppressing box may be provided in the pipe, wherein, in some cases, the distance from the control panel to the exhaust opening may be less than 5 cm.

Furthermore, it is also effective, as a noise suppressing means, to connect a sound insulating material in the form of a porous or fibrous aggregate, such as felt or a sponge body, to the exhaust port 46 or to enclose the open end of the tube 51 with such a sound insulating material.

In accordance with another aspect of the present invention, there is provided a membrane separation type oxygen enriching apparatus in which an improvement is made to ensure a stable supply of a necessary amount of oxygen enriched air having a preselected oxygen concentration even at a high atmospheric temperature in hot seasons, such as in summer. A preferred embodiment of such an improvement will be described hereinafter.

In FIG. 8, which schematically illustrates a membrane separation type oxygen enriching system according to the preferred embodiment, the same reference numerals and characters as FIG. 1 designate the same or like elements and materials. The oxygen enriching system of FIG. 8 comprises a plurality of membrane elements 1 provided with selectively permeable membranes which permit the permeation of oxygen at a higher rate than nitrogen, respectively. The shape of the membrane may be flat, tubular or hollow fibrous. The concrete membrane element 1 is constructed, for example, by extending one or two of the above-mentioned selectively permeable membranes on one side or on both sides, respectively, of a support frame, for example, an aluminum frame. The support frame is provided with an outlet port 2 for drawing off the oxygen-enriched air drawn across the selectively permeable membrane.

In this oxygen enriching apparatus, a plurality of the membrane elements 1 are divided into several groups, for example, two or three groups, which have substantially different effective membrane areas. The oxygen-enriched air is derived from the individual groups of membrane elements. The oxygen enriching system is provide with means for changing the operational groups from which the oxygen-enriched air is derived. In the embodiment shown in FIG. 8, the membrane elements 1 are divided into a first group 3 and a second group 4. The oxygen-enriched air is derived individually from the groups 3 and 4 through manifolds 5 and 6, respectively. A manual or automatic valve 7 is provided as means for changing the number of operational groups. When the temperature of the atmospheric air 8 directed from outside to the selectively permeable membranes is high, the valve 7 is closed. When the valve 7 is an automatically controllable valve, the valve 7 may be controlled according to data obtained by a means for detecting the temperature of the air 8 directed to the outer surface of the membrane elements 1, the pressure prevailing within the component on the oxygen-enriched air side, such as the interior of the membrane element or the oxygen-enriched air drawing conduit, or the oxygen concentration of the derived oxygen-enriched air. The valve is not necessarily controlled only for opening and closing; the degree of opening of the same may be controlled, if necessary.

When the membrane elements 1 are divided into two groups, the desirable ratios of the effective membrane areas of the groups to the total effective membrane area of the apparatus are: 60 to 80%, preferably, 65 to 70%, for the first group, and 20 to 40%, preferably, 25 to 35%, for the second group. When the membrane elements are divided into three groups, the ratios are: 40 to 60%, preferably 45 to 55%, for the first group, 25 to 40%, preferably, 30 to 40%, for the second group, and 10 to 25%, preferably, 15 to 25%, for the third group. It is desirable to provide only the oxygen-enriched air collecting manifolds of the second and third groups with valves, respectively, as means for changing the number of operational groups of membrane elements. It is desirable to control the valves so that all the groups become operational when the atmospheric temperature is low, only either the first and second groups or the first and third groups become operational when the atmospheric temperature is comparatively high, and only the first group becomes operational when the atmospheric temperature is very high.

Thus in this embodiment, the membrane elements 1 are divided into several groups having substantially different ratios of effective membrane area within specific ranges, respectively, and the number of the operational groups is changed according to the atmospheric temperature. Accordingly, the oxygen enriching system of this embodiment is capable of stably providing the oxygen-enriched air having an oxygen concentration within a preselected range at an atmospheric temperature within a wide range, for example, 10° C. to 30° C. Further increasing the number of the groups of membrane elements is not advantageous because such a modification complicates the construction of the apparatus, increases the cost of the apparatus, and reduces the accessibility of the apparatus. As regards the ratio of effective membrane area of each group of membrane elements, when the membrane elements 1 are divided into two groups, for instance, it is not preferable to reduce the lower limit of the range of the ratio of effective membrane area of the first group to below 60% because, when the lower limit of the ratio is below 60%, oxygen-enriched air having an oxygen concentration greater than a preselected oxygen concentration can be easily provided at a high atmospheric temperature, whereas the flow rate of the oxygen-enriched air tends to be reduced below a preselected level. On the other hand, it is not preferable to increase the ratio of effective membrane area of the first group to over 80% because, when the ratio is greater than 80%, it is difficult to provide oxygen-enriched air having an oxygen concentration above a preselected oxygen concentration at a high atmospheric temperature.

The oxygen-enriching system in which the membrane elements 1 are divided into three groups is more capable of providing oxygen-enriched air having an oxygen concentration greater than a preselected oxygen concentration even under a condition in which the atmospheric temperature is higher than the above-mentioned upper limit, for example, 35° C., than the oxygen enriching system in which the membrane elements 1 are divided into two groups. When an oxygen enriching apparatus is intended for use under a normal operating structions other than the constitution of the groups of membrane elements. The test was conducted under various temperature conditions as shown in table 2, and the flow rate of the oxygen-enriched air and the oxygen concentration of the same were measured. The results of the measurements are shown in Table 2.

TABLE 2

|  | Number of elements | | | Temperature of air (°C.) | Operational groups | Enriched air | |
|---|---|---|---|---|---|---|---|
|  | 1st | 2nd | 3rd |  |  | $O_2$ Concentration (%) | Flow rate (l/min) |
| Example 1 | 18 | 12 | 0 | 27 | 1st | 40.8 | 7 |
| 2 | 18 | 12 | 0 | 15 | 1st, 2nd | 41.8 | 7 |
| 3 | 21 | 9 | 0 | 27 | 1st | 40.5 | 7.5 |
| 4 | 24 | 6 | 0 | 27 | 1st | 40.0 | 8 |
| Control 1 | 15 | 15 | 0 | 26 | 1st | 42.0 | 5.5 |
| 2 | 15 | 15 | 0 | 25 | 1st, 2nd | 38.7 | 9.5 |
| 3 | 27 | 3 | 0 | 28 | 1st | 38.1 | 9.5 |
| Example 5 | 13 | 10 | 7 | 33 | 1st | 40.3 | 7 |
| 6 | 13 | 10 | 7 | 27 | 1st, 2nd | 40.3 | 8 |
| 7 | 13 | 10 | 7 | 15 | 1st, 2nd, 3rd | 42.0 | 7 |
| 8 | 15 | 10 | 5 | 33 | 1st | 40.0 | 7.5 |
| 9 | 12 | 12 | 6 | 25 | 1st, 3rd | 40.5 | 6.8 |
| Control 4 | 10 | 10 | 10 | 32 | 1st | 41.5 | 5.5 | condition, namely, at an atmospheric temperature in the range of 10° to 30° C., it is particularly preferable to divide the membrane elements 1 into two groups instead of dividing the same into three groups because the apparatus in which the membrane elements 1 are divided into two groups is simpler in construction and more accessible than the apparatus in which the membrane elements 1 are divided into three groups.

As illustrated in FIG. 8, it is usual to provide the apparatus with a pressure reducing means 10, such as a vacuum pump, to draw off the oxygen-enriched air through the selectively permeable membranes. However, it is also possible to provide means for pressuring the outer side of the membrane elements 1. Ordinarily, the oxygen-enriched air A drawn off by the vacuum pump 10 is passed through a cooling means 12 having a water holder 11, then through a water separator 13 to separate the condensate. The oxygen-enriched air A then is supplied through a pressurizing orifice 14, a flow regulating valve 15 for regulating the flow rate at a supply flow rate, a flow meter 16 and further through purifying means having therein an adsorbent, and through a bacterial filter to the patient for inhalation. The surplus oxygen-enriched air B is discharged through a port disposed near the flow regulating valve 15. The condensate separated from the oxygen-enriched air A by the water separator 13 is drained through a drain pipe 17 to the water holder 11. On the other hand, the atmosphere C taken into the apparatus through a filter, not shown, by a fan 18 flows about the cooling means 12, flows along the outer surfaces of the membrane elements 1, flows about the vacuum pump 10 to cool the same, and is then discharged as exhausted air D. Naturally, some portion of the oxygen contained in the atmosphere C permeates the selectively permeable membranes 1 as the same flows past the membrane elements 1, and hence the atmosphere C becomes a nitrogen-enriched air, i.e. the exhausted air D after passing the membrane elements 1.

TEST II

Thirty membrane elements each provided on both sides thereof with selectively permeable membranes of poly 4-methyl pentene-1 were divided into two or three groups in various ratios of effective membrane area shown in Table 2. The examples are the same in con- As is apparent from Table 2, according to the technical concept of the present invention where a plurality of the membrane elements are divided into an appropriate number of groups having substantially different effective membrane areas and the number of the operational groups is changed according to the atmospheric temperature, oxygen-enriched air having an oxygen concentration within a preselected range can be effectively and stably obtained even in a hot season, such as in summer, when the atmospheric temperature is high. Generally, the desirable oxygen concentration and flow rate of the oxygen-enriched gas, when the apparatus is applied for medical purposes, are 40% or above and 6 l/min or above, respectively. The oxygen enriching system of the present invention is capable of stably maintaining the oxygen concentration and flow rate of the oxygen-enriched air practically at the same levels as mentioned above, respectively, regardless of variations of the atmospheric temperature. Furthermore, the mechanism for changing the number of the operational membrane elements is simple in construction, can be assembled at a low cost, is readily accessible, and functions stably. These features of the present invention are advantageous in particular when the oxygen enriching apparatus is used in the home for medical purposes.

In accordance with a further aspect of the present invention, there is provided an oxygen enriching apparatus employing selectively oxygen-permeable membranes for producing an oxygen-enriched air, in which an improvement is made to remove excessive moisture stably for an extended period of operation from the oxygen-enriched air which is moistened when the same is drawn off across the selectively oxygen-permeable membranes. A preferred embodiment of such an improvement will be described hereinafter.

Note, as has been described with reference to the oxygen enriching apparatus of FIG. 1, the excessive moisture contained in the oxygen-enriched air is separated from the oxygen-enriched air by the water separator 13. The separated excessive moisture is discharged through the drain pipe 17 to the water holder 11. Therefore, it is possible to drain the separated moisture stably for an extended period of operation by obviating the clogging of a pressure reducing section of the drain pipe 17 formed by filling a fibrous aggregate or the like in the drain pipe 17. It has been found through a study of the development of means to prevent the clogging of the drain pipe that a conduit having a specific morphology or a filter is an effective means to prevent the clogging and that providing a cover having a specific morphology is an effective means to prevent the water from scattering at the free end of the drainage means.

The present invention has been made on the basis of such findings obtained through the above study.

According to the present invention, in an oxygen enriching apparatus comprising a plurality of membrane elements incorporating the above-mentioned selectively oxygen-permeable membranes, deriving means for deriving oxygen-enriched air across the membrane elements, cooling means for cooling and condensing the oxygen-enriched air, and a water separator for separating the condensate produced when the oxygen-enriched air is cooled, a water drain pipe having a pressure reducing section having a multiple number of narrow paths is connected to the water separator, the water drain pipe is provided at a position between the water separator and the pressure reducing section with means to prevent clogging of the pressure reducing section with foreign matter contained in the drainage and, desirably, a cylindrical cover is attached to the free end of the water drain pipe to prevent drainage scatter. The improvements according to the present invention as applied to the oxygen enriching system of the oxygen enriching apparatus of FIG. 1 will be described hereinafter.

FIG. 9 illustrates the construction of a conventional water drain pipe connected to the water separator, in which the water drain pipe 17 is packed entirely with fibers 55 over the overall length thereof, and one end, i.e., the inlet end, of the drain pipe 17 is fastened to the water outlet of the water separator 13 with a tie 56. Since the conventional drain pipe 17 is packed with the fibers 55 up to the inlet end thereof, the drain pipe 17 is liable to be clogged with solid matter contained in the drainage. FIGS. 10 to 14 illustrate several examples of drain pipes according to the present invention. FIGS. 10 to 13 illustrate drain pipes each having a conduit 57 interposed between a water separator 13 and a pressure reducing unit packed with fibers 55. The conduit 57 is disposed with the inlet 57a and outlet 57b thereof directed upward; and a portion of the conduit 57 is expanded to form an expansion chamber 58 as a clogging preventing means, or a restrictor 59 formed as a water nozzle is provided in the conduit 57 as the clogging preventing means. The clogging preventing means completely prevents any foreign matter contained in the drainage from attaching to and depositing on the entrance of the pressure reducing unit.

When the expansion chamber 58 is formed near the outlet end 57b of the conduit means 57 as illustrated in FIG. 12, or when the restrictor 59 having a narrow opening is provided near the outlet end 57b of the conduit means as illustrated in FIG. 13, in particular, the foreign matter is liable to be dispersed in the drainage before the discharge thereof through the narrow pressure reducing paths of the drain pipe 17, and hence, the pressure reducing paths will not be clogged. When the construction shown in FIG. 13 is employed, the drainage stays in the conduit means 57 before the restrictor 59 and the restrictor 59 spouts the drainage intermittently as the level of drainage exceeds a certain level, and thereby the inlet end of the pressure reducing path is washed with the drainage.

In a clogging preventing means shown in FIG. 11, foreign matter is deposited and arrested on the bottom of an expansion chamber 58. In the clogging preventing means of FIGS. 10 to 13, preferably, the drainage should not stay in the bottom of the water separator 13 after the operation of the oxygen enriching apparatus has been stopped. Therefore, it is preferred that the inlet of the pressure reducing unit of the present invention is positioned at a level lower than that of the lower end of the water separator 13.

It is also possible to prevent the entrance of foreign matter into the pressure reducing unit by providing, in combination, a first filter 60 and a second filter 61 as illustrated in FIG. 14. It is desirable that the size of the pores of the filters be in the range of 1 to 1000$\mu$, preferably, 1 to 100$\mu$. Preferably, the size of the pores of the first filter 60 (e.g., 100$\mu$) is greater than that of the second filter 61 (e.g., 30$\mu$). Possible filter elements are filter cloth, felt, nonwoven fabric, sintered metals and synthetic resins, and porous substances.

Figure 15:
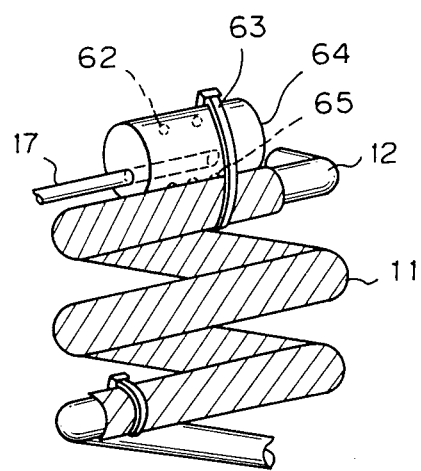
FIG. 15 is a partial perspective view of an end of a water drainage unit, illustrating a water-scattering prevention construction according to the present invention.

FIG. 15 illustrates a scattering preventing construction in which one end of the drain pipe 17, namely, the junction of the drain pipe 17 and the water holder 11 covering the cooling means 12, is covered with a cylindrical cover 64 for preventing water-scatter from the drain. The cylindrical cover 64 is fixed with a tie 63 to the upper part of the cooling means 12 covered with the water holder 11 formed by a rayon braid, gauze or other fibrous aggregate. The opposite ends of the cylindrical cover 64 are closed. Air discharge ports 62 and drain ports 65 are formed in the upper and lower surfaces, respectively, of the cylindrical cover 64. The cylindrical cover 64 may be of any shape and any material, however, ordinarily, the shape thereof is cylindrical and a preferable material is a hydrophobic material, such as hard vinyl chloride. The air discharge port 62 and the drain ports may be of any shape, such as holes or slits. Preferably, the air discharge ports 62 open into the interior of the spiral construction of the cooling means 12. Furthermore, it is desirable that the free end of the drain pipe 17 be cut diagonally so that the drainage flows smoothly into the interior of the cover 64.

As is apparent from the foregoing description, the provision of the clogging preventing means to prevent the clogging of the drain pipe 17 and the provision of the cover around the free end of the drain pipe 17 ensures a stable drainage of the condensate and prevents drainage scatter; and, in addition, should the drainage staying in the conduit interconnecting the oxygen-enriched air drawing means and the cooling means after the oxygen enriching apparatus has been stopped rush into the water separating means when the oxygen enriching apparatus is restarted, the drainage will be received in the space in the clogging preventing means, and hence will not be sprayed into the oxygen-enriched air but will be discharged in the normal manner.

Figure 16:
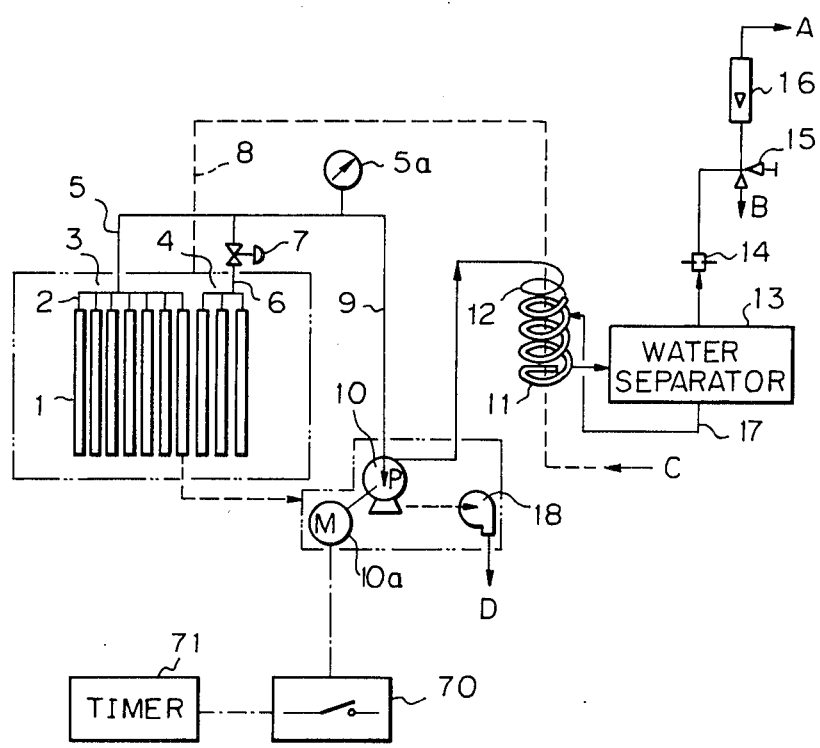
FIG. 16 is a diagrammatic view of a membrane separation type oxygen enriching apparatus according to a further embodiment of the present invention.
Figure 17:
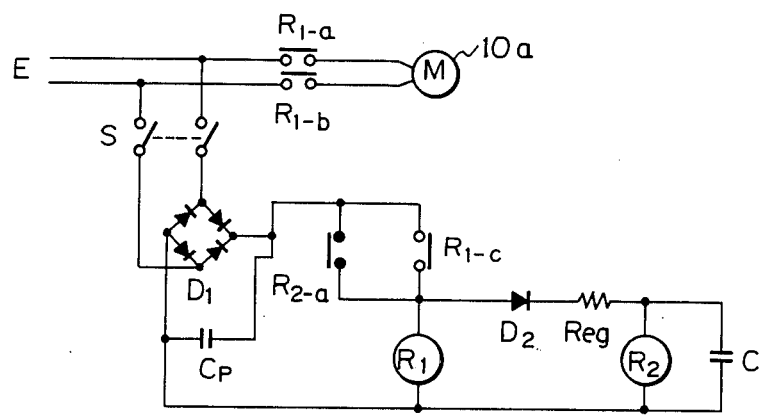
FIG. 17 is an electric circuit diagram of a control system for controlling the restarting of an electric motor used to drive a vacuum pump of an oxygen enriching apparatus, according to an embodiment of the present invention.
Figure 18:
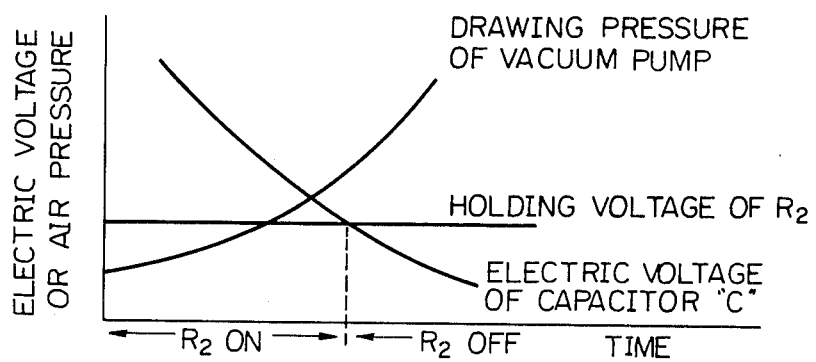
FIG. 18 is a graph illustrating the characteristics of the circuit of FIG. 17.

In accordance with a further aspect of the present invention, a malfunction preventing means is associated with the electric motor for driving the vacuum pump of the oxygen-enriched air drawing-in means. FIGS. 16 to 18 illustrate two exemplary applications of such a malfunction preventing means to the membrane separation type oxygen enriching apparatus of FIG. 1.

Referring to FIG. 16, the oxygen-enriched air A drawn through the membrane elements 1 flows through a conduit 9 provided with a pressure detecting means 5a, a vacuum pump 10 driven by an electric motor 10a, a cooling means 12 having a water holder 11, a water separator 13, a pressurizing means 14 such as an orifice, a flow regulating means 15, a flowmeter 16 and, if necessary, further flows through a purifying means or a bacterial filter to a device for inhalation. On the other hand, the atmospheric air C is drawn through a suitable air filter into the apparatus, is caused to flow about the cooling means 12 and the membrane elements 1, and is then exhausted by a fan 18.

This oxygen enriching apparatus is characterized by a control system which inhibits the start of the electric motor 10a when the load torque of the vacuum pump 10 is greater than the rated starting torque of the electric motor 10a, when restarting the oxygen enriching apparatus immediately after the same has been stopped, and permits the electric motor 10a to start after the load torque of the vacuum pump 10 has dropped below the starting torque of the electric motor 10a.

FIG. 16 illustrates a control system, for controlling the restart of the electric motor 10a, having a timer 71 interlocked with a main switch 70. Upon interruption of the operation of the oxygen enriching apparatus, the timer 71 starts to measure time elapsed. When the main switch 70 is turned to the ON-position within a preselected time, for example, a time in the range of 10 to 60 sec, preferably, 15 to 30 sec, after the interruption of the operation of the oxygen enriching apparatus, the timer 71 allows the electric motor 10a to be restarted automatically upon the lapse of the preselected time after the interruption of the operation.

A suitable preselected time can be set on the basis of the pressure rising rate on the suction side of the vacuum pump 10 after the interruption of the operation.

An exemplary control system employing a specific electric circuit shown in FIG. 17 also is cppable of restarting the electric motor 10a upon the lapse of a preselected time after the interruption of the operation of the oxygen enriching apparatus. Referring to FIG. 17, while the oxygen enriching apparatus is in operation, a relay $R_1$ is closed to supply power from a power source E to the electric motor 10a. In this state, a capacitor C is charged and a relay $R_2$ is open. When a main switch S is opened, the relay $R_1$ opens, and thereby the electric motor 10a is stopped. If the main switch S is closed immediately after the electric motor 10a has been stopped, the capacitor C supplies a current to the relay $R_2$ and the capacitor C is discharged over a period of time as shown in FIG. 18 to hold the relay $R_2$ closed and to inhibit the relay $R_1$ from closing. Consequently, the electric motor 10a is unable to restart before the preselected time has lapsed. As the capacitor C is discharged further, the voltage of the capacitor C drops below a holding voltage for holding the relay $R_2$, and thereby the relay $R_2$ is opened. Consequently, the relay $R_1$ is closed, and hence the electric motor 10a is restarted automatically. The duration of the period in which the relay $R_2$ is in a closed state can be adjusted by changing the characteristics of the capacitor C. This duration corresponds to the preselected time after the lapse of which the electric motor 10a can be restarted. In FIG. 18, there are shown a main relay $R_1$, the contacts $R_{1-a}$, $R_{1-b}$, and $R_{1-c}$ of the main relay $R_1$, an auxiliary relay $R_2$, the contact $R_{2-a}$ of an auxiliary relay $R_2$, a capacitor C, a smoothing capacitor $C_p$, a rectifier $D_1$, a diode $D_2$, and a resistance $R_{eg}$.

A further control system for controlling the restart of the electric motor 10a may be such a control system having pressure detecting means 5a interlocked with the main switch 70 and adapted to restart the electric motor 10a after the pressure on the suction side of the vacuum pump 10 has risen above a preselected pressure.

The above-mentioned oxygen enriching apparatus of the present invention is capable of preventing burn-out of the electric motor, which may occur when restarting the electric motor immediately after the interruption of operation of the apparatus, and the resultant generation of injurious gases, and is safe, accessible and durable. When applied for medical purposes, the oxygen enriching apparatus of the present invention functions safely and reliably without requiring any particular attention.

Although the invention has been described with particular reference to preferred embodiments, various modifications and variations are possible in the light of the above description.

We claim:

1. A low-noise apparatus for providing oxygen-enriched air to a medical patient, the apparatus comprising:

an outer casing means having an intake opening for intaking into said casing a flow of atmospheric air, to exhaust opening for exhausting a first part of the flow of atmospheric air, and a first outlet port for delivering a second oxygen-enriched part of the flow of atmospheric air to a patient;

an oxygen enriching system accommodated in said outer casing means for supplying said second oxygen-enriched part of the flow of atmospheric air to said first outlet port, said oxygen enriching system including oxygen enriching means operable to enrich said second part of said flow of atmospheric air with oxygen, a motor-driven pumping means for causing said second flow of atmospheric air to pass through said oxygen enriching means, piping means for carrying said second part of the flow of air via said pumping means and said oxygen enriching means to said first outlet port, and fan means for causing said flow of atmospheric air generally directed from said intake opening of said outer casing means toward said exhaust opening;

soundproof box means defining an impervious-to-sound chamber, said motor-driven pumping means and said fan means being completely accommodated within said chamber, the box means having an inlet port communicating with said intake opening for permitting said atmospheric air to flow into said chamber and a separate outlet port communicating with said exhaust opening for permitting said first part of the flow of atmospheric air to exit from the outer casing means after cooling said motor-driven pumping means and said fan means;

elongated air intake passage means formed within said outer casing means for restrictively guiding said flow of atmospheric air from said intake opening to said inlet port, said intake passage means having bends at at least five positions, each of said positions being lined with sound absorbing material; and elongated air exhaust passage means formed within said outer casing means for restrictively guiding said first part of the flow of atmospheric air from said separate outlet port of said soundproof box means to said exhaust opening, said air exhaust passage means having a plurality of partition plates such that the exhaust passage means includes bends at at least five positions, each of said partition plates being lined with sound absorbing material.

2. An apparatus for providing oxygen-enriched air according to claim 1, wherein an overall length of said air exhaust passage means is from 0.4 to 2.0 times an overall length of said air intake passage means.

3. An apparatus for providing oxygen-enriched air according to claim 1, wherein said outer casing means comprises a parallelepiped casing having three different pairs of spaced apart opposed plane surfaces, and wherein the length of each of said air intake and air exhaust passage means is not less than the minimum spacing between said three different pairs of opposed plane surfaces.

4. An apparatus for providing oxygen-enriched air according to claim 1, wherein said air intake and air exhaust passage means have substantially right-angled bends in three dimensions.

5. An apparatus for providing oxygen-enriched air according to claim 1, wherein said air intake and air exhaust passage means comprise sound-insulated passage means air-tight against the atmosphere except for said intake and exhaust openings of said outer casing means.

6. An apparatus for providing oxygen-enriched air according to claim 1, wherein said soundproof box means comprises a metallic box, sound absorbing material covering the interior of the metallic box, and vibration damping material disposed for mounting said motor-driven pumping means and said fan means inside the metallic box.

7. An apparatus for providing oxygen-enriched air according to claim 6, wherein said soundproof box means further comprises a soundproof wooden box containing said metallic box, said soundproof wooden box being disposed within said outer casing means.

8. An apparatus for providing oxygen-enriched air according to claim 1, wherein said outer casing means comprises a sound insulatable wooden box sealed entirely except for said intake and exhaust openings and said first outlet port for said oxygen-enriched air.

9. An apparatus for providing oxygen-enriched air according to claim 1, wherein said piping means of said oxygen enriching system comprises a silencer tank for deadening pulsation sound of said oxygen-enriched air delivered to said first outlet port.

10. An apparatus for providing oxygen-enriched air according to claim 9, wherein said silencer tank is located in said soundproof box means.

11. An apparatus for providing oxygen-enriched air according to claim 1, wherein said oxygen enriching system further includes flow regulating means having an inlet port for said oxygen-enriched air, an outlet port for a regulated flow of said oxygen-enriched air and an exhaust port for exhausting a surplus flow of said oxygen-enriched air other than said regulated flow of said oxygen-enriched air, and sound attenuating means arranged at said exhaust port of said flow regulating means, said sound attenuating means being provided for deadening sound generated by said surplus flow of said oxygen-enriched air upon being exhausted from said exhaust port.

12. An apparatus for providing oxyen-enriched air according to claim 11, wherein said sound attenuating means comprises a tubing means attached to said exhaust port of said flow regulating means and having a length not less than 5 cm.

13. An apparatus for providing oxygen-enriched air according to claim 12, wherein said tubing means is a resin tube having one end connected to said exhaust port via a pipe coupling and another end extended toward the interior of said outer casing means.

14. An apparatus for enriching air with oxygen, according to claim 11, wherein said sound attenuating means comprises a noise suppression box attached to said exhaust port of said flow regulating means.

15. An apparatus for providing oxygen-enriched air according to claim 11, wherein said sound attenuating means comprises a covering made of porous material and enclosing said exhaust port of said flow regulating means.

16. An apparatus for providing oxygen-enriched air to a medical patient, said apparatus including a plurality of membrane elements respectively provided with a selectively permeable membrane permitting permeation of oxygen therethrough at a higher rate than nitrogen upon being applied thereto with atmospheric air, and means for deriving said oxygen-enriched air from the plurality of membrane elements, the improvement wherein said plurality of membrane elements are divided into a predetermined number of groups having respective effective membrane areas for permeation, said predetermined number of groups of membrane elements being provided with respective conduit means for establishing a corresponding number of fluid connections to said means for deriving said oxygen-enriched air, wherein there is provided means for changing said number of said fluid connections between said predetermined number of groups of membrane elements and said means for deriving said oxygen-enriched air within said predetermined number, and wherein said means for deriving said oxygen-enriched air comprises a pressure reducing means for drawing off said oxygen-enriched air from said plurality of membrane elements, said pressure reducing means comprising a vacuum pump driven by an electric motor, the apparatus further comprising controlling means for preventing said electric motor from being started before a vacuum level prevailing on a suction side of said vacuum pump drops below a predetermined vacuum level, said controlling means comprising an electric relay cirucit means including a combination of a first relay having normally-open contacts disposed between said electric drive motor and an electric power source and a second relay having a normally-closed contact which is forcibly opened so as to prevent electrical energization of said first relay for a predetermined period of time after stopping of said electric drive motor.

17. An apparatus for providing oxygen-enriched air, according to claim 16, wherein said means for changing said number of said fluid connections comprises valve means arranged in at least one of said respective conduit means, said valve means being opened and closed in response to a change in temperature of said atmospheric air.

18. An apparatus for providing oxygen-enriched air, according to claim 16, wherein said plurality of membrane elements is divided into a first and second group of membrane elements, the effective membrane area of said first group of membrane elements being from 60 through 80 percent of the total effective membrane area of said first and second groups.

19. An apparatus for providing oxygen-enriched air, according to claim 16, wherein said plurality of membrane elements is divided into a first, a second, and a third group of membrane elements, the effective area of said first group of membrane elements being from 40 through 60 percent of the total effective membrane areas of said first through third groups, the effective area of said second group of membrane elements being from 25 through 40 percent of the total effective membrane areas, and the effective membrane area of said third group of membrane elements being from 10 through 25 percent of the total effective membrane areas.

20. An apparatus for providing oxygen enriched air, according to claim 16, wherein said apparatus further comprises cooling means for cooling said oxygen enriched air, water separating means for separating water condensate produced when said oxygen enriched air is cooled by said cooling means, water drain means connected to said water separating means for draining said condensate, said water drain means having therein a fluid pressure reducing section which is formed therein with a multiple number of narrow fluid paths, said water drain means being provided at a position between said water separating means and said fluid pressure reducing section with clogging preventing means for preventing clogging of said fluid pressure reducing section with foreign matter contained in said drained condensate, said clogging preventing means comprising a water conduit means having an inlet end directly connected to a lower portion of said water separating means and an outlet end upwardly connected to an entrance of said fluid pressure reducing section of said water drain means.

21. An apparatus for providing oxygen enriched air, according to claim 20, wherein said water drain means is provided at an outermost end thereof with a cylindrical covering for preventing scatter of said drained condensate.

22. An apparatus for providing oxygen enriched air, according to claim 20, wherein said cylindrical covering is closed at at least one end thereof, and a cylindrical surface thereof is formed with air drain ports at an upper portion of said cylindrical surface and water drain ports at a lower portion of said cylindrical surface.

23. An apparatus for providing oxygen enriched air, according to claim 21, wherein said cylindrical covering is fixed to a portion of said cooling means covered with a moisture holding element.

24. an apparatus for providing oxygen enriched air, according to claim 20, wherein said water conduit means is formed with an expansion chamber between said one inlet and other outlet ends thereof.

25. An apparatus for providing oxygen enriched air, according to claim 20, wherein said water conduit means is provided with a restrictor for forming a water nozzle at a position between said one inlet and other outlet ends of said water conduit means.

26. An apparatus for providing oxygen enriched air, according to claim 20, wherein said one inlet end of said water conduit means is upwardly connected to said lower portion of said water separating means, and positioned at a level higher than said other outlet end of said water conduit means, connected to said entrance of said fluid pressure reducing section of said water drain means.

27. An apparatus for providing oxygen enriched air, according to claim 20, wherein said clogging preventing means comprises at least one filter element.

28. An apparatus for providing oxygen enriched air, according to claim 27, wherein said filter element has an opening ranging from 1 through 1000 micrometers.

29. An apparatus for providing oxygen enriched air, according to claim 20, wherein said fluid pressure reducing section of said water drain means is a cylindrical section packed with a fibrous aggregate.

30. In an apparatus for providing oxygen-enriched air to a medical patient, said apparatus including a plurality of membrane elements respectively provided with a selectively permeable membrane permitting permeation of oxygen therethrough at a higher rate than nitrogen upon being applied thereto with atmospheric air, and means for deriving said oxygen-enriched air from the plurality of membrane elements, the improvement wherein said plurality of membrane elements are divided into a predetermined number of groups having respective effective membrane areas for permeation, said predetermined number of groups of membrane elements being provided with respective conduit means for establishing a corresponding number of fluid connections ot said means for deriving said oxygen-enriched air, wherein there is provided means for changing said number of said fluid connections between said predetermined number of groups of membrane elements and said means for deriving said oxygen-enriched air within said predetermined number, and wherein said means for deriving said oxygen-enriched air comprises a pressure reducing means for drawing off said oxygen-enriched air from said plurality of membrane elements, said pressure reducing means comprising a vacuum pump driven by an electric motor, the apparatus further comprising controlling means for preventing said electric motor from being started before a vacuum level prevailing on a suction side of said vacuum pump drops below a predetermined vacuum level, and wherein said control means comprises a combination of a timer means and an electric switching means connected to said electric motor, said timer means operating so as to prevent said electric switching means from becoming ON for a predetermined period of time after stopping of said electric drive motor.

31. An apparatus for providing oxygen-enriched air, according to claim 30, wherein said means for changing said number of fluid connections comprises valve means arranged in at least one of said respective conduit means, said valve means being opened and closed in response to a change in temperature of said atmospheric air.

32. An apparatus for providing oxygen-enriched air, according to claim 31, wherein said plurality of membrane elements is divided into a first and second group of membrane elements, the effective membrane area ff said first group of membrane elements being from 60 through 80 percent of the total effective membrane area of said first and second groups.

33. An apparatus for providing oxygen-enriched air, according to claim 31, wherein said plurality of membrane elements is divided into a first, a second, and a third group of membrane elements, the effective area of said first group of membrane elements being from 40 through 60 percent of the total effective membrane areas of said first through third groups, the effective area of said second group of membrane elements being from 25 through 40 percent of the total effective membrane areas, and the effective membrane area of said third group of membrane elements being 10 through 25 percent of the total effective membrane areas.

34. An apparatus for providing oxygen-enriched air to a medical patient, the apparatus comprising:

a plurality of membrane elements, each element being provided with a selecltively permeable membrane having an upstream surface and a downstream surface, the membrane permitting permation of oxygen therethrough at a higher rate than nitrogen upon application of atmospheric air to the upstream surface of the membrane;

a vacuum pumping means for drawing oxygen-enriched air from the downstream surface of the membrane of each of the plurality of membrane elements;

an electric drive motor for driving said vacuum pumping means; and control means for preventing said electric drive motor from being started before a vacuum level prevailing on a suction side of said vacuum pumping means drops below a predetermined vacuum level, said control means comprising a combination of a timer means and an electric switching means connected to said electric motor, said timer means operating so as to prevent said electric switching means from becoming ON for a predetermined period of time after stopping of said electric drive motor.

35. An apparatus for providing oxygen-enriched air to a medical patient, the apparatus comprising:

a plurality of membrane elements, each element being provided with a selectively permeable membrane having an upstream surface and a downstream surface, the membrane permitting permeation of oxygen therethrough at a higher rate than nitrogen upon application of atmospheric air to the upstream surface of the membrane;

a vacuum pumping means for drawing oxygen-enriched air from the downstream surface of the membrane of each of the plurality of membrane elements;

an electric drive motor for driving said vacuum pumping means; and an electric relay circuit means including a combination of a first relay having normally-open contacts disposed between said electric drive motor and an electric power source, a second relay having a normally-closed contact disposed in the energizing circuit of said first relay, and means for activating said second relay for a predetermined period of time when said electric drive motor becomes deenergized to open said normally-closed contact so as to prevent electric energization of said first relay for a predetermined period of time after stopping of said electric drive motor.

36. An apparatus for providing oxygen-enriched air to a medical patient, the apparatus comprising:

a plurality of membrane elements, each element being provided with a selectively permeable membrane having an upstream surface and a downstream surface, the membrane permitting permeation of oxygen therethrough at a higher rate than nitrogen upon application of atmospheric air to the upstream surface of the membrane;

a vacuum pumping means for drawing oxygen-enriched air from the downstream surface of the membrane of each of the plurality of membrane elements;

an electric drive motor for driving said vacuum pumping means;

control means for automatically delaying restart of said electric drive motor after an interruption of operation of said apparatus until at least a time when a vacuum level prevailing on a suction side of said vacuum pumping means drops below a predetermined vacuum level.

37. An apparatus according to claim 36, wherein said control means comprises a switching means for restoring the operation of said apparatus upon being operated within a predetermined period of time after said interruption of operation of said apparatus.

* * * * *

UNITED STATES PATENT AND TRADEMARK OFFICE
CERTIFICATE OF CORRECTION

PATENT NO. : 4,789,388

DATED : 6 December 1988

INVENTOR(S) : K. NISHIBATA et al.

It is certified that error appears in the above-identified patent and that said Letters Patent is hereby corrected as shown below:

| Column | Line | |
|---|---|---|
| 8  | 47 | Delete "sound". |
| 9  | 21 | Change "apparatus" to --apparatuses--. |
| 11 | 58 | Change "provide" to --provided--. |
| 17 | 36 | Change cppable" to --capable--. |
| 17 | 62 | Change "FIG. 18" to --FIG. 17--. |
| 18 | 25 | Change "to" to --an--. |
| 20 | 49 | Change "cirucit" to --circuit--. |
| 21 | 43 | Change "20" to --21--. |
| 22 | 25 | Change "of" to --to--. |

UNITED STATES PATENT AND TRADEMARK OFFICE
CERTIFICATE OF CORRECTION

PATENT NO. : 4,789,388

DATED : 6 December 1988

INVENTOR(S) : K. NISHIBATA et al.

It is certified that error appears in the above-identified patent and that said Letters Patent is hereby corrected as shown below:

| Column | Line | |
|--------|------|---|
| 22 | 61 | Change "ff" to --of--. |

Signed and Sealed this

Twenty-fifth Day of July, 1989

Attest:

DONALD J. QUIGG

Attesting Officer

Commissioner of Patents and Trademarks